(12) United States Patent
Gimeno Monge et al.

(10) Patent No.: US 9,277,446 B2
(45) Date of Patent: Mar. 1, 2016

(54) INTERFERENCE MITIGATING METHOD

(71) Applicant: ST-Ericsson SA, Plan-les-Ouates (CH)

(72) Inventors: Pablo Ignacio Gimeno Monge, Nice (FR); Javier Del Prado Pavon, Antibes (FR); Nikhil Taluja, Southlake, TX (US)

(73) Assignee: ST-ERICSSON SA, Plan-les-Ouates (CH)

( * ) Notice: Subject to any disclaimer, the term of this patent is extended or adjusted under 35 U.S.C. 154(b) by 38 days.

(21) Appl. No.: 14/350,257

(22) PCT Filed: Oct. 8, 2012

(86) PCT No.: PCT/EP2012/069820
§ 371 (c)(1),
(2) Date: Apr. 7, 2014

(87) PCT Pub. No.: WO2013/053660
PCT Pub. Date: Apr. 18, 2013

(65) Prior Publication Data
US 2014/0273843 A1    Sep. 18, 2014

Related U.S. Application Data

(60) Provisional application No. 61/554,707, filed on Nov. 2, 2011.

(30) Foreign Application Priority Data

Oct. 10, 2011    (EP) .................................... 11306311

(51) Int. Cl.
*H04B 5/00*       (2006.01)
*H04B 1/10*       (2006.01)
*H04W 28/04*      (2009.01)
*H04B 15/06*      (2006.01)
*H04M 1/60*       (2006.01)

(52) U.S. Cl.
CPC ........... *H04W 28/048* (2013.01); *H04B 1/1027* (2013.01); *H04B 5/00* (2013.01); *H04B 15/06* (2013.01); *H04M 1/6016* (2013.01); *H04M 2250/04* (2013.01)

(58) Field of Classification Search
CPC ..... H04B 1/1027; H04B 5/00; H04W 28/048; H04M 2250/04
See application file for complete search history.

(56) References Cited

U.S. PATENT DOCUMENTS

| 6,032,048 | A  | * | 2/2000  | Hartless et al. | ................ 455/506 |
| 6,144,936 | A  | * | 11/2000 | Jarvinen et al. | ................ 704/226 |
| 6,795,559 | B1 | * | 9/2004  | Taura et al.    | .................. 381/94.8 |
| 2002/0066104 | A1 |  | 5/2002  | Shibusawa      | |

(Continued)

FOREIGN PATENT DOCUMENTS

| EP | 2337231 A1 | 6/2011 |
| WO | 9618251 A1 | 6/1996 |

(Continued)

*Primary Examiner* — Bobbak Safaipour
*Assistant Examiner* — Devan Sandiford
(74) *Attorney, Agent, or Firm* — Coats & Bennett, PLLC

(57) ABSTRACT

Embodiments of the invention concern a method for mitigating interference between near field communication and an audio stream in a mobile user equipment (1), wherein the method includes a step (S5) of replacing at least part of the interfered audio stream by a sound representative of an interfering near field communication transaction.

14 Claims, 1 Drawing Sheet

(56) References Cited

U.S. PATENT DOCUMENTS

| | | |
|---|---|---|
| 2006/0026626 A1* | 2/2006 | Malamud et al. ............... 725/10 |
| 2007/0033015 A1* | 2/2007 | Taira et al. ................... 704/219 |
| 2008/0068133 A1* | 3/2008 | Hashimoto et al. .......... 340/10.1 |
| 2010/0062754 A1* | 3/2010 | Allen et al. ................... 455/418 |
| 2010/0137025 A1 | 6/2010 | Tal et al. |
| 2010/0277383 A1 | 11/2010 | Autti et al. |
| 2012/0214409 A1* | 8/2012 | Tzoreff et al. ............... 455/41.1 |
| 2013/0045679 A1* | 2/2013 | Orsatti et al. ................ 455/41.1 |
| 2015/0072623 A1* | 3/2015 | Mofidi ......................... 455/63.3 |

FOREIGN PATENT DOCUMENTS

| | | |
|---|---|---|
| WO | 9842081 A1 | 9/1998 |
| WO | 2010006198 A2 | 1/2010 |

\* cited by examiner

# INTERFERENCE MITIGATING METHOD

TECHNICAL FIELD

The invention relates to interference mitigating methods, and more particularly to methods mitigating interference between near field communication and audio stream in mobile user equipment.

BACKGROUND

Near field communication (NFC) is a short range radio technology based on the inductive coupling of two loop antennas resonating at 13.56 MHz. Typical data rates are in the range of 100 to 400 Kbps. Communication distance between both antennas is in the range of several centimeters, preferably less than 10 cm.

A mobile user equipment, for example a mobile phone, may integrate several technologies in a single component, near field communication technology with some other technologies among which cellular modem, Bluetooth, frequency modulation (FM) radio, Global Navigation Satellite Systems (GLONASS), and/or Wireless Local Area Network (WLAN).

The close proximity of near field communication function to other functions, as well as the relative high power level of this near field communication function, may result in interference affecting these other functions.

More particularly, near field communication function may interfere with FM audio stream in such a way that FM audio stream is degraded beyond recovery. In particular, because of the relative high power level of near field communication, harmonic of near field communication resonance frequency can overlap with frequency range of FM audio stream in such a way that audio stream cannot be recovered anymore.

Mobile phone user may be disturbed by this degradation of audio stream quality which can go so far as a loss of audio stream content. If duration of such interference is relatively long, the ear of the mobile phone user will notice this interference and the user may become disturbed by it.

In a first prior art, for example described in US 2010/0277383 or in WO 2010/006198 or in US 2010/0137025, it is known to perform some filtering steps in order to recover audio stream. If degradation is beyond recovery, this first prior art cannot work.

In a second prior art, for example described in EP 2337231, it is known either to reduce the duration of near field communication traffic or to mute the audio stream. It is often complex and not always possible to play on the duration of near field communication traffic. Muted audio stream, whereas not so disturbing as interference for user's ear, is still an annoyance for mobile phone user.

SUMMARY

The object of the present invention is to alleviate at least partly the above mentioned drawbacks.

More particularly, the invention aims to reduce negative impact of interference between near field communication and audio stream on mobile user equipment user's experience.

In an embodiment of the invention, instead of either try and recover corrupted audio stream, which is often burdensome and not always possible, or mute corrupted audio stream, which is simple to do but easily noticeable by user's ear with a negative impact on user's experience, the corrupted audio stream is replaced by a sound which is representative of the interfering near field communication transaction, preferably by a pre-recorded sound which is simpler to implement.

In that way, not only the user's ear is no more negatively impacted by a blank due to muted audio stream, but also user's experience is positively impacted by being provided with a supplementary useful information which is about the nature of the pending near field communication transaction. Pending near field communication transaction is the near field communication transaction under execution at the time of interference. If near field communication were not to interfere, user would not have got this useful information. In other words, invention has turned out a drawback into an advantage, in a rather straight-forward way.

Even if information relating to near field communication transaction is also provided to user in another way, for example by a visual pop up on mobile user equipment's display, providing such an information with help of a sound is for user a confirmation providing an added level of security.

In a situation when interfering near field communication transaction uses a very powerful signal, especially when source is close to mobile user equipment, and when very powerful signal, whereas its fundamental mode not in same frequency range, still leads to harmonics of higher order being still sufficiently powerful to interfere noticeably in frequency range of audio stream, and when mobile user equipment has got low or no control on said interfering near field communication transaction, either timing and/or duration of said signal, the interference mitigating method according to an embodiment of the invention is all the more better than the prior art existing methods. Frequency range of audio stream is higher than frequency range of near field communication.

More generally speaking, in another embodiment of the invention, in order to mitigate interference in mobile user equipment between a first signal received in a first frequency band and at least one harmonic received in first frequency band of a second signal received in a second frequency band disjoined from first frequency band, at least part of interfered first signal is replaced by a third signal in first frequency band, said third signal being representative of a content of second signal. Instead of playing or transmitting or muting corrupted first signal, third signal providing useful information about second signal to user of mobile user equipment is played or transmitted. Not only is user not disturbed, but also the user is provided with a useful piece of supplementary information.

This object is achieved with a method for mitigating interference in a mobile user equipment (1) between a first signal received in a first frequency band and at least one harmonic received in a first frequency band of a second signal received in a second frequency band disjoined from the first frequency band, the first signal received in the first frequency band being converted into an interfered third signal in a third frequency band distinct from first frequency band, wherein the method comprises a step (S5) of replacing at least part of the interfered third signal by a fourth signal in the third frequency band, said fourth signal being representative of a content of the second signal.

This object is also achieved with a method for mitigating interference between near field communication and an audio stream in a mobile user equipment (1), wherein the method includes a step (S5) of replacing at least part of the interfered audio stream by a sound representative of an interfering near field communication transaction.

This object is also achieved with a mobile user equipment (1) comprising a near field communication antenna (5) adapted to communicate with a near field communication antenna of a peer device (6) independent from the mobile user equipment (1), a radio module (3) adapted to receive an audio stream from outside the mobile user equipment (1), a loudspeaker (2) adapted to play an audio stream, a processing unit (4) adapted to communicate with said mobile user equipment near field communication antenna (5), and adapted to transmit to the loudspeaker (2) the audio stream received from the radio module (3), wherein the processing unit (4) is further adapted to transmit to the loudspeaker (2) a sound representative of an interfering near field communication transaction instead of audio stream received from the radio module (3).

Preferred embodiments comprise one or more of the following features:
- the third frequency band is an audible frequency.
- the third interfered signal is a stream and the fourth signal is a pre-recorded signal.
- the fourth signal is representative of a transaction performed by the second signal.
- timing and/or duration of said interfering near field communication transaction is not mastered by the mobile user equipment (1).
- the interfering near field communication transaction is non-periodic and is initiated by a peer device (6) independent from the mobile user equipment (1).
- the mobile user equipment (1) uses its real-time knowledge of interfering near field communication transaction progress to adapt audio stream replacement duration to interference duration.
- the mobile user equipment (1) uses its real-time knowledge of interfering near field communication transaction progress to start the audio stream replacement as soon as interference duration becomes longer than a first predetermined threshold.
- the mobile user equipment (1) uses its real-time knowledge of interfering near field communication transaction progress to stop the audio stream replacement after end of interference.
- the audio stream replacement duration is longer than a second predetermined threshold itself longer than the longest duration of all possible interfering near field communication transactions.
- the audio stream is not replaced for interfering near field communication for periodic polling initiated by the mobile user equipment (1) which polling is broken down into several communications sufficiently short to be non-disturbing for mobile user equipment user's ear.
- said sound is a pre-recorded sound.
- said audio stream is frequency modulation audio stream.
- the mobile user equipment comprises a memory (7) adapted to store pre-recorded sounds representative of interfering near field communication transactions, and adapted to provide said pre-recorded sounds to the processing unit (4) upon request thereof.

In an embodiment of the invention, said pre-recorded sound is a cash machine sound for a payment transaction and/or said pre-recorded sound is an access control clearance for a ticketing transaction.

In an embodiment of the invention, audio stream replacement duration is comprised between 500 ms and 2 s.

In an embodiment of the invention, said first predetermined threshold is equal or less than 5 ms.

In an embodiment of the invention, selection of pre-recorded sound to replace corrupted audio stream can be customized, that is to say left to the choice of mobile user equipment's user.

In an embodiment of the invention, mobile user equipment is a mobile phone.

Further features and advantages of the invention will appear from the following detailed description of the embodiments of the invention, given as non-limiting examples, with reference to the accompanying drawings listed hereunder.

DETAILED DESCRIPTION OF THE EMBODIMENTS OF THE INVENTION

Figure 1:
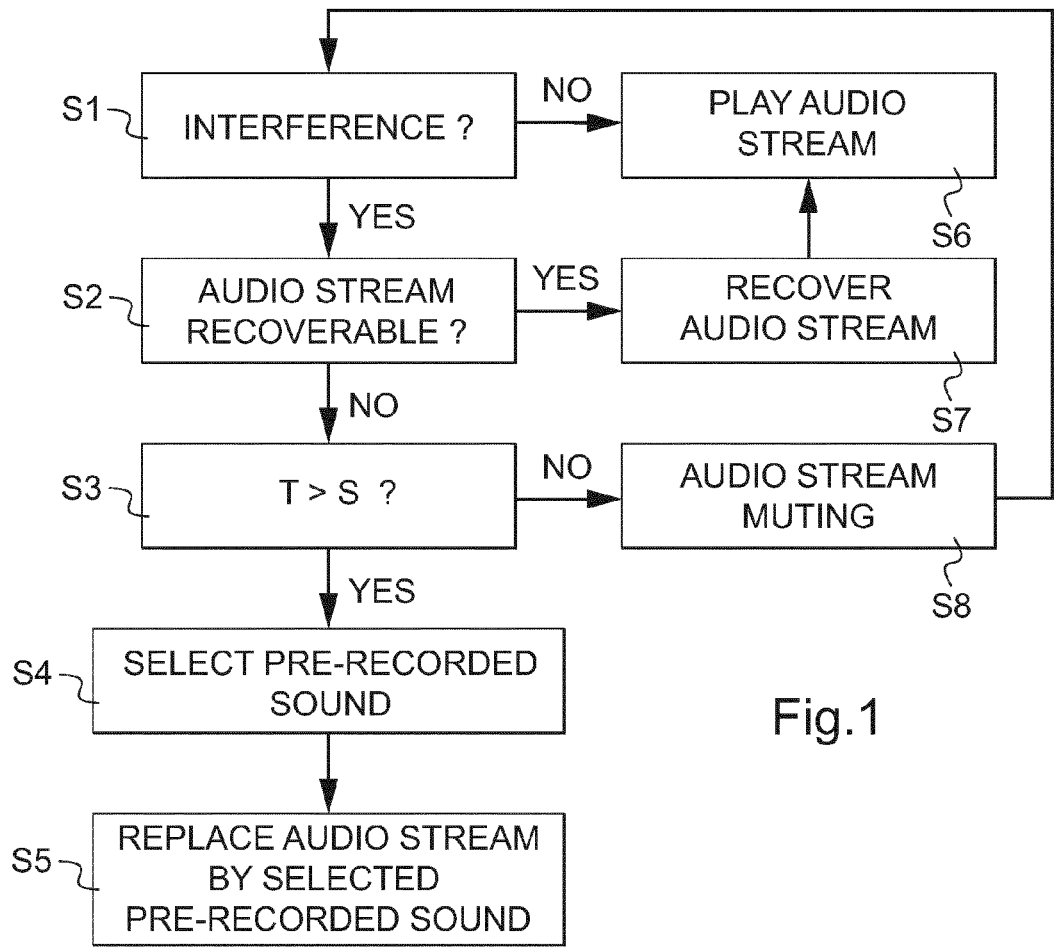
FIG. 1 shows an example of the steps performed by an interference mitigating method according to an embodiment of the invention.

FIG. 1 shows an example of the steps performed by an interference mitigating method according to an embodiment of the invention. The interference mitigating method includes several steps, a interference detection step S1, an audio stream recoverability assessment step S2, an interference duration assessment step S3, a pre-recorded sound selection step S4, a replacement step S5, an audio stream playing step S6, an audio stream recovering step S7, an audio stream muting step S8.

Interference mitigating method starts with step S1. In step S1, the start of an interfering near field communication transaction is detected. Either there is interference or not. If no starting interference is detected, then we go to audio stream playing step S6. If a starting interference is detected, then we go to audio stream recoverability assessment step S2. In an embodiment of the invention, audio stream is frequency modulation audio stream. At least one of near field communication signal harmonic will fall into the FM frequency band. So, interference mitigating method is all the more interesting here, because harmonics of near field communication transactions will often interfere with audio stream in FM band.

In audio stream recoverability assessment step S2, the capability to recover the audio stream that is being corrupted by the starting interfering near field communication transaction is assessed. Either the corrupted audio stream is recoverable or not. Capability to recover corrupted audio stream can be linked for example to power level of interfering near field communication transaction. If corrupted audio stream is recoverable, then we go to audio stream recovering step S7. If corrupted audio stream is not recoverable, then we go to interference duration assessment step S3.

In interference duration assessment step S3, the total duration of interfering near field communication transaction which has just started is evaluated. This total duration can be known as soon as the content first(s) exchange(s) has or have led to identify the type of transaction and as long as the total duration of such type of transaction is known in advance. This estimated total duration is compared to a predetermined threshold. The predetermined threshold can be chosen such as a total duration less than this predetermined threshold is more or less usually unnoticeable by a human ear.

Either estimated total duration is above this predetermined threshold or not. If estimated total duration is equal or below this predetermined threshold, then we go to audio stream muting step S8. If estimated total duration is above this predetermined threshold, then we go to pre-recorded sound selection step S4. At end of interference duration assessment step S3, we will more often get to sound selection step S4, when timing and/or duration of said interfering near field communication transaction is not mastered by mobile user equipment. A preferred example of such an interfering near field communication transaction is non-periodic and is initiated by e.g. a peer device independent from a mobile user equipment and in such a situation the mobile user equipment has absolutely no control over the interfering transaction hence the interference mitigating method according to embodiments of the invention is all the more better than any existing prior art method.

In pre-recorded sound selection step S4, a pre-recorded sound is selected. The type of pre-recorded sound is selected according to the type of the interfering near field communication transaction which has just started. Each pre-recorded sound is associated to a type of near field communication transaction. The pre-recorded sound associated to interfering near field communication transaction is a sound representative of said interfering near field communication transaction. For example, said pre-recorded sound may be a cash machine sound for a payment transaction. For example, said pre-recorded sound may be an access control clearance for a ticketing transaction.

An alternative option is to customize the correspondence between pre-recorded sounds and types of near field communication transactions; mobile user equipment's user is given the possibility to choose the association between types of near field communication transaction on the one side and pre-recorded sounds on the other side. Another alternative is to use pre-recorded sounds, but a different one each time; for example a randomly chosen jazz music jingle each time a payment transaction occurs. Another alternative option is to use non pre-recorded sounds. For example, the coming portion of a classical music audio stream in another frequency band (where there is no interference) can be played for a payment transaction and the coming portion of a pop music audio stream in another frequency band (where there is no interference) can be played for a ticketing transaction. Still another alternative is to let the choice between all preceding alternatives to the user as a configuration option accessible via the mobile phone menu system.

Duration of selected pre-recorded sound can be predetermined or chosen as a function of estimated duration of starting interfering near field communication transaction. Mobile user equipment may use its real-time knowledge of interfering near field communication transaction progress to adapt audio stream replacement duration to interference duration. Several options may be taken into account.

In an option, mobile user equipment uses its real-time knowledge of interfering near field communication transaction progress to start audio stream replacement as soon as interference duration becomes longer than a first predetermined threshold. This threshold value is chosen so as not to be too much bothered with interfering signals and so short that they are unnoticeable by a human ear. Said first predetermined threshold is preferably equal or less than 5 ms.

In another option, which may be combined with preceding option or not, mobile user equipment uses its real-time knowledge of interfering near field communication transaction progress to stop audio stream replacement after end of interference. Either total duration of interference is known in advance and pre-recorded sound duration is calculated according to it, or once interference is no more detected during a period, it is assumed that transaction is ended. To be sure to discard all corrupted parts of audio stream, audio stream replacement duration is preferably longer than a second predetermined threshold itself and longer than the longest duration of all possible interfering near field communication transactions. Said audio stream replacement duration is preferably comprised between 500 ms and 2 s. This allows both being sure interfering near field communication transaction is ended and providing a reasonably long pre-recorded sound which will be all the more meaningful for the user.

So, at end of pre-recorded sound selection step S4, the content and the duration of selected pre-recorded sound have been chosen; a sequence ready to be played has been selected. Then we go to replacement step S5.

In replacement step S5, the corrupted part of audio stream is replaced by the selected pre-recorded sound. The corrupted part of audio stream is muted and covered by the selected sequence which is played instead of the corrupted part of audio stream.

In audio stream playing step S6, the audio stream is played. The played audio stream is either original audio stream, when coming directly from interference detection step S1 or from interference duration assessment step S3, or recovered audio stream, when coming directly from audio stream recovering step S7.

In audio stream recovering step S7, original audio stream is recovered, that is to say is filtered and processed in order to remove corrupted parts issued from interference and to get back as much as possible to the original content of original audio stream. At end of audio stream recovering step S7, we have a recovered audio stream which is much closer to original audio stream than corrupted audio stream was.

In audio stream muting step S8, original audio stream is muted, that is to say a blank, a silence is put instead of audio stream. This audio stream muting step S8 lasts as long as interference. At end of audio stream muting step S8, we go back to interference detection step S1.

If interfering near field communication is not a transaction, whose timing and/or duration is not mastered by mobile user equipment, then mobile user equipment can anticipate the future interference and try and make it the less disturbing possible for the user, even sometimes try and make it unnoticeable for the human ear. According to an embodiment of the invention, audio stream is then not replaced for interfering near field communication periodic polling initiated by mobile user equipment. On the contrary, such polling is broken down into several communications sufficiently short to be non-disturbing for mobile user equipment's user's ear.

Figure 2:
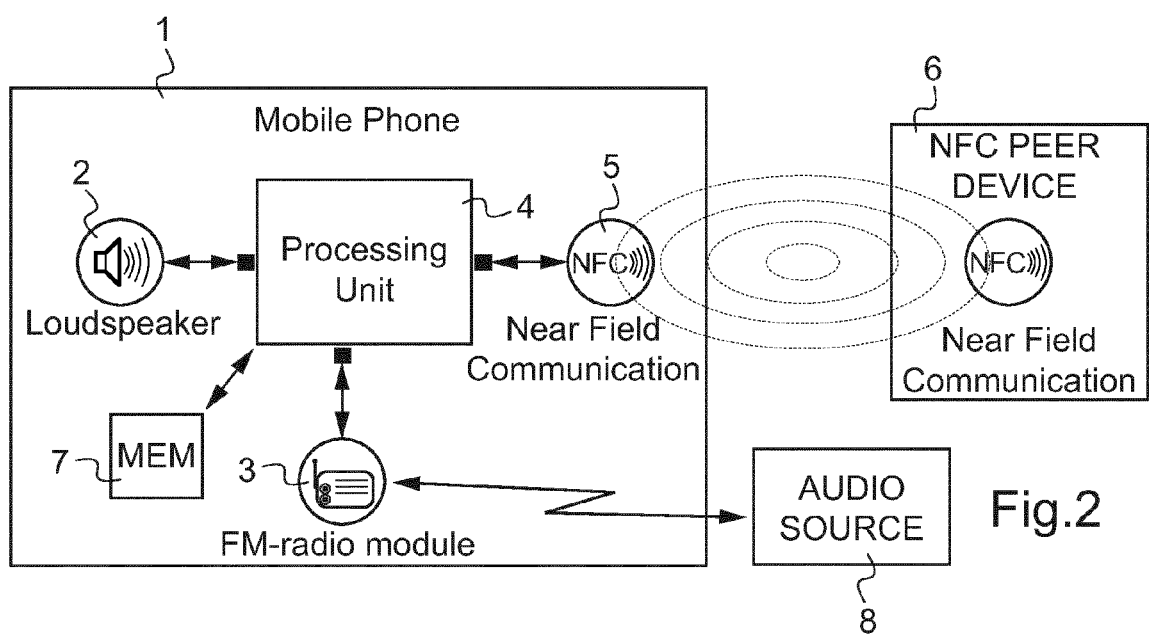
FIG. 2 shows an example of mobile user equipment according to an embodiment of the invention.

FIG. 2 shows an example of mobile user equipment according to an embodiment of the invention. Such mobile user equipment may be used to implement at least part of method steps described in FIG. 1. Mobile user equipment 1 comprises a near field communication antenna 5, and a radio module 3, and a loudspeaker 2, and a memory 7, and a processing unit 4. All elements of mobile user equipment 1, that is to say near field communication antenna 5, memory 7, radio module 3 and loudspeaker 2, are connected to processing unit 4 and can exchange information with one another via processing unit 4.

Near field communication antenna 5 is adapted to communicate with a near field communication antenna of a peer device 6 independent from mobile user equipment 1. Radio module 3 is adapted to receive an audio stream from outside the mobile user equipment 1, for example from broadcasting outside audio source 8. Loudspeaker 2 is adapted to play an audio stream, which is to be listened to by user of mobile user equipment 1.

Processing unit 4 is adapted to communicate with said mobile user equipment 1 near field communication antenna 5. It is also adapted to transmit to loudspeaker 2 audio stream received from radio module 3. According to an embodiment of the invention, processing unit 4 is also adapted to transmit to loudspeaker 2 a sound representative of an interfering near field communication transaction instead of audio stream received from radio module 3. This interfering near field communication transaction is taking place between near field communication antenna 5 and near field communication antenna of independent peer device 6.

Memory 7 is adapted to store pre-recorded sounds representative of interfering near field communication transactions between near field communication antenna 5 and near field communication antenna of independent peer device 6. Memory 7 is also adapted to provide said pre-recorded sounds to processing unit 4 upon request thereof.

This interfering near field communication transaction taking place between near field communication antenna 5 and near field communication antenna of independent peer device 6 causes harmful interference to FM audio signal coming from radio module 3. Mobile user equipment 1 cannot modify the way this interfering transaction is performed in order to limit the negative impact of interfering transaction, because timing and duration of this interfering near field communication transaction is mastered by independent peer device 6. Mobile user equipment 1 may only try and limit indirectly the effect on audio stream degradation. The way chosen according to an embodiment of the invention is to remove audio stream corrupted by interference and to replace it by other information meaningful for user of mobile user equipment.

Following is a list of abbreviations used in specification and drawings.

NFC: Near Field Communication
FM: Frequency Modulation

The invention has been described with reference to preferred embodiments. However, many variations are possible within the scope of the invention.

The invention claimed is:

1. A method for mitigating interference in a mobile user equipment between a first signal received in a first frequency band and at least one harmonic, received in the first frequency band, of a second signal received in a second frequency band disjoined from the first frequency band, the method comprising:
converting the first signal received in the first frequency band into an interfered third signal in a third frequency band distinct from the first frequency band;
replacing at least part of the interfered third signal by a fourth signal output in the third frequency band when the second signal is non-periodic and is initiated by a peer device independent from the mobile user equipment, wherein said fourth signal is representative of a content of the second signal; and
breaking down the second signal into several communications sufficiently short to be non-disturbing for a user of the mobile user equipment and outputting the interfered third signal when the second signal is periodic and is initiated by the mobile user equipment.

2. The method according to claim 1, wherein the third frequency band comprises an audible frequency band.

3. The method according to claim 1, wherein the interfered third signal comprises a stream and wherein the fourth signal comprises a pre-recorded signal.

4. The method according to claim 1, wherein the fourth signal is representative of a transaction performed by the second signal.

5. A method for mitigating interference between a near field communication and an audio stream in a mobile user equipment, the method comprising:
replacing at least part of the audio stream by a sound representative of an interfering near field communication transaction when the interfering near field communication transaction is non-periodic and is initiated by a peer device independent from the mobile user equipment; and
breaking down the interfering near field communication transaction into several communications sufficiently short to be non-disturbing for a user of the mobile user equipment and outputting the audio stream when the interfering near field communication transaction comprises periodic polling initiated by the mobile user equipment.

6. The method according to claim 5, wherein at least one of a timing and a duration of the interfering near field communication transaction is not mastered by the mobile user equipment.

7. The method according to claim 5, further comprising using real-time knowledge of a progress of the interfering near field communication transaction to adapt a duration of the replacing of the at least part of the audio stream to a duration of the interference.

8. The method according to claim 7, further comprising using the real-time knowledge of the progress of the interfering near field communication transaction to start the replacing of the at least part of the audio stream as soon as the duration of the interference becomes longer than a first predetermined threshold.

9. The method according to claim 7, further comprising using the real-time knowledge of the progress of the interfering near field communication transaction to stop the replacing of the at least part of the audio stream after an end of the interference.

10. The method according to claim 5, wherein a duration of the replacing of the at least part of the audio stream is longer than a second predetermined threshold, and wherein the second predetermined threshold is longer than the longest duration of all possible interfering near field communication transactions.

11. The method according to claim 5, wherein the sound comprises a pre-recorded sound.

12. The method according to claim 5, wherein the audio stream comprises a frequency modulation audio stream.

13. A mobile user equipment comprising:
a near field communication antenna configured to communicate with a near field communication antenna of a peer device independent from the mobile user equipment;
a radio configured to receive an audio stream from outside the mobile user equipment;
a loudspeaker; and
a processing circuit configured to communicate with said mobile user equipment near field communication antenna;
wherein the processing circuit is further configured to transmit to the loudspeaker a sound representative of an interfering near field communication transaction instead of the audio stream received from the radio when the interfering near field communication transaction is non-periodic and is initiated by a peer device independent from the mobile user equipment; and
wherein the processing circuit is further configured to transmit to the loudspeaker the audio stream received from the radio when the interfering near field communication transaction comprises periodic polling initiated by the mobile user equipment, wherein the polling is broken down into several communications sufficiently short to be non-disturbing for a user of the mobile user equipment.

14. The mobile user equipment according to claim 13, further comprising a memory configured to store pre-recorded sounds representative of one or more interfering near field communication transactions, and configured to provide said pre-recorded sounds to the processing circuit upon request.

* * * * *